Patented Oct. 19, 1937

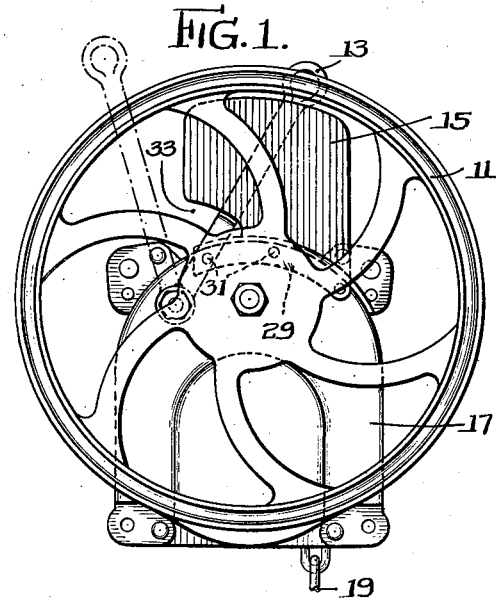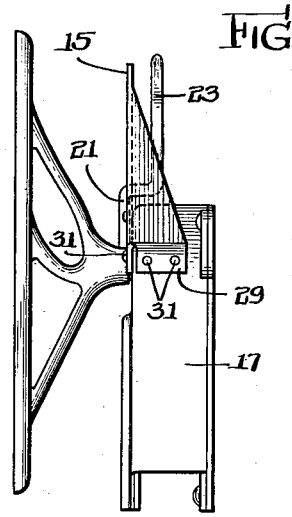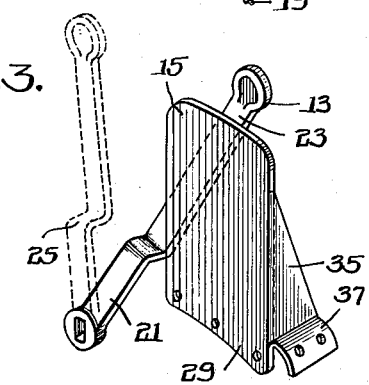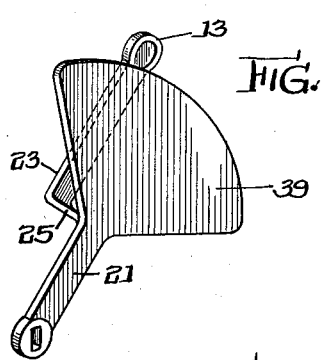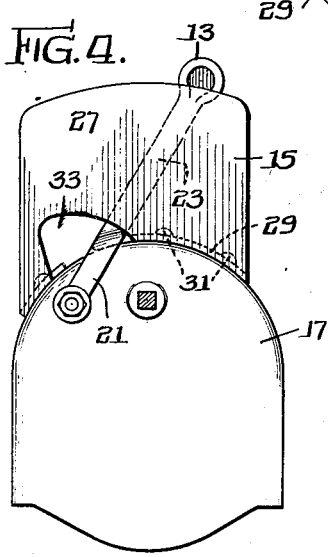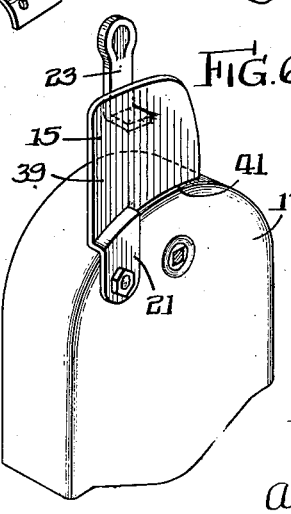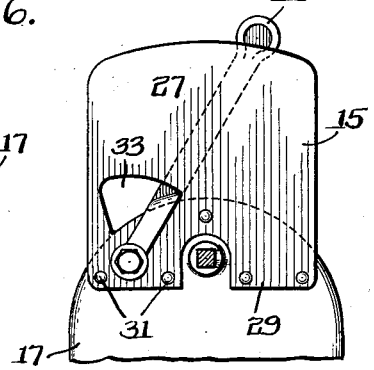

2,096,058

UNITED STATES PATENT OFFICE 2,096,058

HANDWHEEL OPERATED MECHANISM

Arthur F. O'Connor, Chicago, Ill., assignor, by mesne assignments, to Union Asbestos & Rubber Company, Chicago, Ill., a corporation of Illinois Application February 4, 1935, Serial No. 4,727

18 Claims. (Cl. 74—552)

My invention relates, in general, to protection devices and has more particular reference to a safety device or attachment, for use in conjunction with apparatus embodying a hand wheel, to prevent the operator from inserting a hand or arm between the spokes of the wheel with possible resulting injury in the event that the hand wheel is forcibly rotated by the mechanism with which it is associated.

The invention more specifically relates to the application of safety means, of the character mentioned, in mechanism embodying a hand wheel and an operating device, such as a lever, located adjacent and behind the hand wheel, in such position that the operator may be tempted to insert a hand or arm between the spokes of the wheel in manipulating the adjacently located operating device; and the invention has for an important object the provision of guard means in position to prevent manipulation of the operating device by insertion of a hand or arm between the spokes of the wheel.

Another important object is to form the guard means as an integral part of the operating device or lever to prevent manipulation of the lever by the insertion of hand or arm between the spokes of an adjacently mounted hand wheel.

Another important object is to form the guard means so as to provide a stop for limiting the operating movement of the lever.

Another important object is to provide a mechanism of the character mentioned having a lever formed with means affording a stop for limiting the operating movement of the lever.

A still further object is to provide guard means of the character mentioned and adapted for attachment as a fitting on existing mechanisms without changing the same.

Numerous other objects, advantages and inherent functions of the invention will be apparent from the following description, which, taken in connection with the accompanying drawing, discloses selected embodiments of the invention.

Referring to the drawing:

Figure 1 is an elevation view of a railroad brake tensioning mechanism including a hand wheel and a release lever and provided with protective means in accordance with my present invention;

Figure 2 is a side view of the device shown in Figure 1;

Figure 3 is a perspective view illustrating a modified form of the release lever and guard means;

Figure 4 is an elevation view illustrating a modified form of the guard means;

Figure 5 is an elevation view illustrating a modified form of the guard means;

Figure 6 is a perspective view illustrating a modified form of the invention, wherein the guard means comprises an integral part of the release lever; and Figure 7 is a perspective view illustrating a modified form of the integral guard means and lever.

To illustrate my invention, I have shown on the drawing a mechanism comprising a hand wheel 11 and an adjacently mounted hand lever 13, and the invention comprises the provision of guard means 15 for preventing the manipulation of the lever by insertion of a hand or arm between the spokes of the wheel 11.

While I have shown the invention as applied in mechanism comprising the winding gear for tensioning railroad brakes, it will be obvious that the invention is not necessarily restricted to railway brake-tensioning mechanism, but may be applied wherever it is desired to prevent the operation of a manually operable element by insertion of a hand or arm in a dangerous position, as between the spokes of a hand wheel which is liable to be rotated suddenly and with considerable force by the mechanism with which it is associated. Since this danger condition is inherent in the hand wheel operated railway brake-tensioning mechanism, I have illustrated such a device in order to demonstrate my present invention.

The railway brake-tensioning mechanism shown comprises a casing 17, adapted to be mounted in operating position on the end of a railroad car. The housing 17 contains mechanism for drawing a brake-tensioning element 19 into the casing in response to the rotation of the hand wheel 11, so as to apply the brakes of the car, the tensioning-element 19 being connected with the brake rigging. The mechanism also includes pawl means within the casing 17 for retaining the tensioning mechanism in brake-applied position, said pawl means being operable by the lever 13 to release the mechanism in order to permit the brakes to release.

I have not illustrated the internal mechanism within the casing 17, since the same may be any suitable or well known tensioning device, such as is shown in my co-pending application, Serial Number 711,154, filed February 14, 1934.

In such a mechanism, the lever position shown in solid lines in the drawing is that occupied by the lever in holding the mechanism in the brake-on position, in which the member 19 is under maximum tension. In order to release the brakes, it is necessary to throw the lever 13, toward the left, viewing Figures 1, 4, and 5, and when this is done the tension on the member 19 causes the hand wheel 11 to rotate and with considerable force. If the operator, in manipulating the lever 13, has inserted an arm between the spokes of the wheel, it will be obvious that the sudden forceful rotation of the wheel may result in injury to the operator. Not only may the limb of the operator be broken or otherwise injured, but the force of the rotating wheel may be sufficient to throw the operator from the car and accidents of this character have frequently occurred in the past.

In order to provide for the prevention of accidents of this character, I provide means for preventing the operator from manipulating the lever 13, when the same is in the brake-applied position, by insertion of a hand or arm between the spokes of the wheel.

The handle 13 is pivotally mounted on the casing 17 and extends behind the plane of the wheel 11 and, as shown in Figures 1, 2, and 3, the protection device 15 comprises a plate-like element adapted for attachment on the casing in position to extend between the plane of the wheel and the handle 13, when the same is at least in its brake-on position. The handle 13, in the illustrated embodiments, comprises a portion 21, overlying the face of the casing 17, and a grasping portion 23 offset with respect to the portion 21 in position extending opposite the top of the casing, the portions 21 and 23 being connected by means of a lever portion 25.

The guard means may be mounted in any convenient manner to extend between the wheel and the lever and while I have shown the guard mounted on the casing in Figures 1 through 5 and on the lever in Figures 6 and 7, it will be obvious that the guard may be mounted otherwise than as shown. I prefer, however, to avoid mounting the guard on the hand wheel in order to maintain the weight of the wheel at a minimum, particularly where the same comprises a part of a winding device. When a hand brake of the character herein described is set, the chain 19 is subjected to a tension of the order of several thousand pounds. When the mechanism is released by shifting the lever, this tension is applied to rotate the wheel through the winding mechanism. It is frequently necessary to stop the wheel before it reaches the fully off position. This is accomplished by returning the lever to the latching or on position, thus locking the winding mechanism against unwinding movement. Any increase in the weight of the handwheel, particularly at the periphery thereof, will increase the strain placed upon the mechanism when the wheel is suddenly stopped so that by avoiding arrangement of the guard on the wheel, I reduce the chance of damaging the mechanism during operation of the same.

As shown in Figures 1 through 5, the guard 15 comprises a plate-like portion 27, having flanges 29, by means of which the same may be connected on the casing 17 in any suitable fashion as by the fastening devices 31. The plate-like portion 27 also is or may be notched or perforated as at 33 to permit the connecting portion of the lever to extend through the plate at least when the lever is in the brake-on position, although, as shown in Figure 3, the guard plate need not necessarily be notched providing the lever may extend behind the same when in the "brake on" or dangerous position. In the embodiment shown in Figures 1 and 2, however, the notch 33 is formed in one edge of the plate, so that, when the lever is in the brake-releasing position, no part of the same will be within the marginal confines of the guard plate. Since there is no particular danger of injury to the operator, through sudden rotation of the hand wheel during manipulation of the lever when the same is in the brake-released position, it is not essential to extend the guard plate to prevent manipulation of the lever between the spokes of the wheel when in the brake-released position. However, as shown in Figures 4 and 5, I may so extend the plate, in which event the opening 33 is contained entirely within the marginal confines of the guard plate. It will be noted that, in such a case, the shape of the opening 33 is such as to permit the lever 25 to travel unobstructedly within said opening from the brake-applied to the brake-released position. It is also within the contemplation of my present invention to utilize the slotted plate as stop means for limiting the movement of the lever.

As shown in Figure 4, the flange portion 29 is shaped to fit the top or crown of the casing 17. In Figure 5, the flange portions 29 engage the forward face of the casing 17, while in the arrangement illustrated in Figures 1, 2, and 3, the guard has portions 29 seating on and secured to the face of the casing 17 and a flange or brace 35 having a portion 37 adapted to seat on and be secured to the top of the casing adjacent one side thereof.

In Figures 6 and 7, I have shown a modified arrangement wherein the guard forms an integral portion of the lever 13. In the embodiment illustrated in Figure 6 the guard 15 comprises a plate-like element 39 formed with a forwardly offset portion adapted to function and serve as the lever portion 21, which overlies the face of the casing 17 and is operatively connected to the brake-releasing mechanism within the casing. Near its upper edge, the plate 39 is formed with a rearwardly offset portion adapted to function as the handle portion 23 of the lever. The plate 39, however, is of such size that it will prevent access to the handle portion 23 between the spokes of the handwheel and the plate may be, and preferably is, formed along its lower edge adjacent the offset portion, forming the base of the lever, to conform with the crown of the casing 17 as at 41 so that the plate will bear upon the crown of the casing whereby to support the lever in the brake-on position as shown in Figure 6. To release the brake mechanism it is merely necessary to throw the lever 13, shown in Figure 6, toward the left, viewing said figure.

Figure 7 illustrates a modified form of the integral lever and guard plate 39, the lever in this instance being similar in form to the standard levers illustrated in Figures 1 through 5, but having a fan-like extension, forming the plate 39, formed on the lever portion 21, so that the plate 39 extends in position in front of the handle portion and will prevent any attempt to grasp and manipulate the same by insertion of a hand or arm between the spokes of an adjacent handwheel extending in front of said handle.

It is thought that the invention and numerous of its attendant advantages will be understood from the foregoing description and it is obvious that numerous changes may be made in the form, construction, and arrangement of the several parts without departing from the spirit or scope of my invention or sacrificing any of its attendant advantages, the forms herein described being selected embodiments for the purpose of illustrating my invention.

Having thus described my invention, what I claim as new and desire to secure by Letters Patent is as follows:

1. The combination, with a device comprising a frame forming a housing, operable mechanism supported on the frame in position enclosed within said housing and a manually operable mechanism control element on the frame in position extending outwardly of said housing, of a handwheel for driving said mechanism, said handwheel being drivingly connected with said operable mechanism and mounted adjacent the control element outwardly of said housing, said control element extending between said handwheel and said housing and means mounted on said device in position to prevent manipulation of the control element by the insertion of a member between the spokes of the handwheel.

2. In a mechanism comprising a frame element, a handwheel on said frame element and having an opening, and a manually operable element supported on the frame element adjacent the handwheel and between the handwheel and the frame element, the combination of guard means supported on one of said elements in position to prevent manipulation of the operable element by the insertion of a member through said opening of the wheel.

3. In a mechanism comprising a frame, a handwheel on said frame and having an opening, and a manually operable element supported adjacent the handwheel and between the handwheel and said frame, the combination of guard means comprising a plate-like element mounted on and supported by said frame in position extending between the handwheel and said manually operable element to prevent manipulation of the element by the insertion of a member through the opening of the wheel.

4. In a mechanism comprising a frame, a handwheel on said frame and having an opening, and a manually operable element supported adjacent and behind said handwheel, the combination of guard means formed integrally on said operable element in position to prevent manipulation of the element by the insertion of a member through the opening of the wheel.

5. In a mechanism comprising a frame, a handwheel on said frame and having an opening, and a manually operable element shiftable on said frame and extending adjacent and behind the handwheel, the combination of guard means supported from said frame in position to prevent manipulation of the operable element by the insertion of a member through said opening in the wheel, said guard means serving also to limit the movement of said element on the frame.

6. In a mechanism comprising a frame having a forward face and a crown-like top, a handwheel on said frame and extending in front of the face thereof, said handwheel having an opening, and a manually operable element shiftable on the frame, and having a portion extending in front of said face and a grasping portion extending above said crown-like top and opposite the opening of said wheel, the combination of means on said element for limiting its movement on said frame and for preventing manipulation of the same by the insertion of a member through the opening in the wheel.

7. In a mechanism comprising a frame having a forward face and a crown-like top, a handwheel on said frame and extending in front of the face thereof, said handwheel having an opening, and a manually operable element shiftable on the frame, and having a portion extending in front of said face and a grasping portion extending above said crown-like top opposite the opening of said wheel, the combination of means carried by said frame in position to prevent manipulation of the shiftable element by the insertion of a member through the opening of a wheel, said means also co-operating with the element to limit its shifting movement on the frame.

8. In a mechanism comprising a frame having a forward face, a handwheel on said frame and extending in front of the face thereof, said handwheel having an opening, and a manually operable element shiftable on the frame and having a portion extending in front of said face and a grasping portion extending opposite the opening of said wheel, the combination of means comprising a plate-like element carried in position to prevent manipulation of the shiftable element by insertion of a member through the opening of the wheel, said plate-like means having an opening for receiving said element whereby said element may extend with its grasping portion disposed on the side of the plate-like element opposite from said hand wheel.

9. In a mechanism as set forth in claim 8, wherein the frame has a crown-like top opposite the grasping portion of said manually operable element and said plate-like means comprises an attachment secured to the crown-like top of the frame.

10. In a mechanism as set forth in claim 8, wherein said plate-like means comprises an attachment secured to the face of said frame in position extending between the handwheel and the grasping portion of the operable element.

11. In a mechanism as set forth in claim 8, wherein the frame has a crown-like top opposite the grasping portion of said manually operable element and said plate-like means comprises an attachment having a portion secured to the face of said frame in position extending between the handwheel and the grasping portion of the operable element, and a bracing portion secured to the top of said frame.

12. In a mechanism as set forth in claim 4, wherein the integrally formed guard comprises an extension of a portion of the operable element.

13. In a mechanism as set forth in claim 4, wherein the guard comprises a force-transmitting portion of the operable element.

14. In a mechanism comprising a frame forming a housing, tensioning means on the frame for the operation of brake mechanism, said tensioning means comprising means within said housing, a handwheel drivingly connected with said winding means and extending outwardly of said housing and manually operable for tightening the tensioning means, said handwheel having an opening therein and being disposed in spaced relationship in front of a wall of said housing, and a manually operable device comprising a lever controlling releasable latch means for securing the tensioning means in brake-applying position, said lever extending outwardly of said housing and between said housing and the handwheel, and a plate-like guard supported in position between the handwheel and said housing to prevent manipulation of the lever by insertion of a member through the opening in said handwheel.

15. In a mechanism comprising a housing, a handwheel on said housing extending outwardly thereof and having an opening, and a manually operable element shiftable on the housing behind said handwheel and between the handwheel and the housing, said operable element having a grasping portion extending opposite the opening of said wheel, the combination of means comprising a plate-like element carried by the housing in position to prevent manipulation of the shiftable element by insertion of a member through the opening of the wheel, said manually operable element being supported in position whereby the same may extend with its grasping portion disposed on the side of the plate-like element opposite from said handwheel.

16. In a mechanism comprising a housing having a handwheel extending outwardly of a wall of said housing and having an opening, and a manually operable element shiftable on the housing behind said handwheel and between the handwheel and the housing, said operable element having a grasping portion extending opposite the opening of said wheel, the combination with said housing of guard means extending in position to prevent manipulation of the manually operable element by the insertion of a member through the opening of the wheel, said guard having portions positioned between said wheel and the grasping portion of the manually operable element.

17. In a mechanism comprising a housing having a handwheel extending outwardly of a wall of said housing and having an opening, and a manually operable element shiftable on the housing behind said handwheel and between the handwheel and the housing, said operable element having a grasping portion extending opposite the opening of said wheel, the combination with said housing of guard means extending in position to prevent manipulation of the manually operable element by the insertion of a member through the opening of the wheel, said guard comprising a plate having edges extending opposite the inner and outer edges of said opening whereby to effectively prevent access to said manually operable element through the opening of said wheel.

18. In a mechanism comprising a housing, a handwheel extending opposite a wall of said housing, said handwheel having a rim, a hub and spaced spokes interconnecting the rim and hub and defining openings between the rim, hub and spokes, and a manually operable element shiftable on said housing and between the handwheel and the housing, said operable element having a grasping portion extending opposite said opening, the combination of means comprising a plate-like element extending in position between said wheel and said element to prevent operation of the element by insertion of a member through said opening, said plate-like means having an edge extending opposite the rim of the wheel and extending inwardly of said edge to substantially completely block access to said element through said opening between the spokes.

ARTHUR F. O'CONNOR.